(12) United States Patent
Kollaja et al.

(10) Patent No.: US 6,436,531 B1
(45) Date of Patent: *Aug. 20, 2002

(54) POLYMER BLENDS AND TAPES THEREFROM

(75) Inventors: Richard A. Kollaja, St. Paul; Steven D. Solomonson, Shoreview; Sarah A. Franzwa, Lake Elmo, all of MN (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,494

(22) Filed: Jul. 20, 1998

(51) Int. Cl.$^7$ ............................. B32B 15/04; B32B 7/12

(52) U.S. Cl. ................................. 428/355 R; 428/343

(58) Field of Search ........................... 428/343, 355 AC

(56) References Cited

U.S. PATENT DOCUMENTS

| | | |
|---|---|---|
| 3,372,049 A | 3/1968 | Schaffhausen |
| 4,152,189 A | 5/1979 | Guerin et al. |
| 4,211,852 A | 7/1980 | Matsuda et al. |
| RE31,213 E | 4/1983 | Brachman |
| 4,430,137 A | 2/1984 | Jones |
| 4,634,740 A | 1/1987 | Fujita et al. |
| 4,692,496 A | 9/1987 | Bahl et al. |
| 4,781,957 A | 11/1988 | Brown et al. |
| 4,898,758 A | 2/1990 | Lipson |
| 4,898,762 A | 2/1990 | Brown et al. |
| 5,026,778 A | 6/1991 | Fujii et al. |
| 5,071,686 A | 12/1991 | Genske et al. |
| 5,212,246 A | 5/1993 | Ogale |
| 5,254,612 A | 10/1993 | Sugi et al. |
| 5,264,493 A | 11/1993 | Palate et al. |
| 5,266,607 A | 11/1993 | Lucas et al. |
| 5,268,220 A | 12/1993 | Tajima et al. |
| 5,296,548 A | 3/1994 | Covezzi et al. |
| 5,314,746 A | 5/1994 | Johnson et al. |
| 5,350,807 A | 9/1994 | Pettijohn et al. |
| 5,360,868 A | 11/1994 | Mosier et al. |
| 5,389,448 A | 2/1995 | Schirmer et al. |
| 5,453,466 A | 9/1995 | Pellegatti et al. |
| 5,468,807 A | 11/1995 | Tsurutani et al. |
| 5,478,891 A | 12/1995 | Lakshmanan et al. |
| 5,483,002 A | 1/1996 | Seelert et al. |
| 5,519,090 A | 5/1996 | Schwager et al. |
| 5,523,117 A | 6/1996 | Woodhall et al. |
| 5,539,056 A | 7/1996 | Yang et al. |
| 5,574,087 A | 11/1996 | Kobayashi et al. |
| 5,574,105 A | 11/1996 | Venkataswamy |
| 5,601,917 A | 2/1997 | Matsui et al. |
| 5,623,021 A | 4/1997 | Pelliconi et al. |
| 5,747,132 A | 5/1998 | Matsui et al. |
| 5,810,960 A | 9/1998 | Matsui et al. |

FOREIGN PATENT DOCUMENTS

| | | |
|---|---|---|
| CA | 2214596 | 2/1998 |
| EP | 0 635 360 A1 | 8/1994 |
| EP | 0 475 307 B1 | 11/1995 |
| EP | 0 475 306 B1 | 3/1997 |

(List continued on next page.)

OTHER PUBLICATIONS

Tsou et al., "Stress Relaxation of Polymer Films in Bending," *Polymer*, vol. 36, No. 5, pp. 949–954 (1995).

A. E. Tonelli, "NMR Spectroscopy and Polymer Microstructure," Verlag Carl Hanser (VCH) Publishers, Inc., Munich, 1989, p. 75.

Masayuki Yamaguchi et al., "Dynamic Mechanical Properties for the Binary Blends of Isotactic Polypropylene with Ethylene–α–Olefin Copolymer," *Reports on Progress in Polymer Physics in Japan*, vol. 39, pp. 457–458 (1996).

Koh–Hei Nitta and Masayuki Yamaguchi, "A Constitutive Equation for Nonlinear Stress–Strain Curves of Crystalline Polymers," *Journal of Materials Science*, vol. 33(4), pp. 1015–1021 (Feb., 1998).

Masayuki Yamaguchi, et al., "Structure and Properties for Binary Blends of Isotactic–Polypropylene with Ethylene–α–olefin Copolymer. 1. Crystallization and Morphology," *Journal of Polymer Science, Part B: Polymer Physics*, vol. 35(6), pp. 953–961 (1997).

Masayuki Yamaguchi, et al., "Rheological Properties for Binary Blends of i–PP and Ethylene–1–hexene Copolymer," *Journal of Applied Polymer Science*, vol. 63(4), pp. 467–474 (1997).

Koh–hei Nitta, et al., "Mechanical Properties of Binary Blends of Polypropylene with Ethylene–α–olefin Copolymer," *Polymer*, vol. 39(1), pp. 53–58 (1997).

Masayuki Yamaguchi, et al., "Mechanical Properties for Binary Blends of PP and Metallocene Based Elastomers," *MetCon'98 Conference*, Jun. 10–11, 1998.

(List continued on next page.)

*Primary Examiner*—Terrel Morris
*Assistant Examiner*—Arti R. Singh

(57) ABSTRACT

Tape backing compositions of the present invention comprise a blend of a first relatively flexible and second relative inflexible polymer, the two polymers having a melting temperature of at least about 93° C. (200° F.). Tape backing compositions of the present invention are especially useful for making flexible films and tapes. Such films and tapes advantageously possess properties particularly useful for applications involving elevated temperatures, such as auto paint masking tape applications, where the flexible film is used as a backing. In one embodiment, the backing is chloride-free. In another embodiment, the backing is essentially free of plasticizers.

26 Claims, No Drawings

FOREIGN PATENT DOCUMENTS

| | | | |
|---|---|---|---|
| EP | 0 763 422 A1 | 3/1997 | |
| EP | 0 832 924 A2 | 8/1997 | ........... C08L/23/02 |
| EP | 0 823 467 A2 | 11/1998 | |
| JP | 8-20685 | 1/1995 | |
| JP | 7-62154 | 3/1995 | |
| JP | 8-003330 | 1/1996 | |
| JP | 8-333557 | 12/1996 | |
| WO | WO96/26967 | 9/1996 | |

OTHER PUBLICATIONS

Masayuki Yamaguchi, et al., "Compatibility of Binary Blends of Polypropylene with Ethylene–α–olefin Copolymer," *Journal of Applied Polymer Science*, vol. 62(1), pp. 87–97 (1996).

"Mixing in Single–Screw Extruders," *Mixing in Polymer Processing*, edited by Chris Rauwendaal (Marcel Dekker Inc., New York (1991) pp. 129, 176–177, and 185–186.

POLYMER BLENDS AND TAPES THEREFROM

FIELD OF THE INVENTION

The present invention relates to polymer blends that exhibit properties useful in tape backing compositions. The tape backing compositions are useful in forming films, such as tape backings in auto paint masking tape.

BACKGROUND OF THE INVENTION

Polyvinyl chloride (PVC) films and tapes are conventionally used for a wide variety of applications. One prevalent use is for auto paint masking applications. PVC has many properties that are advantageous for such applications. For example, PVC films are known to be conformable to the varying topographies present on an automobile's exterior.

One disadvantage of PVC films, however, is the accompanying use of plasticizers in PVC films. Plasticizers are typically needed in PVC films in order to make the films more flexible, lower the glass transition temperature of the films, and make the films more conformable. However, plasticizers can migrate to the substrate on which PVC films are adhered, leaving a residue or "ghosting" when removed. The ghosting is not removable with solvent wipes. Thus, the exterior appearance of the automobile may be detrimentally affected when PVC films are used as the tape backing in auto paint masking tapes. Furthermore, such plasticizers may degrade adjacent adhesive layers, reducing the adherence of the tape to the automobile.

It is desired to have alternative compositions for use in tape backings and films. It is particularly desired to have alternative compositions for use in auto paint masking tapes, where ghosting is often associated with conventional tapes.

SUMMARY OF THE INVENTION

Tape backing compositions of the present invention comprise a blend of a first and second polymer, the two polymers having a melting temperature of at least about 93° C. (200° F.), more preferably at least about 149° C. (300° F.), even more preferably at least about 154° C. (310° F.). Generally, one of the two polymers is more flexible than the other polymer. For example, in one embodiment, the first polymer has an elastic modulus of about 103 MPa or less and the second polymer has an elastic modulus of about 207 MPa or more. Typically, each of the first and second polymers comprises at least about 20 weight %, more preferably at least about 40 weight %, of the blend. It is preferred that each of the polymers in the blend is compatible. Thus, for example, preferably the blend exhibits a single melting temperature.

Accordingly, in one embodiment, the two polymers are polypropylene polymers. Typically, at least one of the polypropylene polymers is more flexible than the other polypropylene polymer. Thus, for example, a first polypropylene polymer can be at least about 20% atactic, more preferably about 25% atactic to about 50% atactic, and a second polypropylene polymer can be at least about 80% syndiotactic and/or isotactic. In another embodiment, the two polymers are polyester polymers. In yet another embodiment, the two polymers are polyamide polymers.

Tape backing compositions of the present invention are especially useful for making flexible films. Such films advantageously possess properties particularly useful for applications involving elevated temperatures, such as auto paint masking tape applications. For example, certain flexible films of the present invention exhibit less than about 5%, more preferably less than about 2%, shrinkage when tested according to ASTM D1204 at 93° C. (200° F.) and 149° C. (300° F.). Furthermore, certain flexible films of the present invention preferably exhibit greater than about 20% stress relaxation when tested at 10% elongation and/or greater than about 40% stress relaxation when tested at 57% elongation. Another preferred property is where the flexible films exhibit less than about 5% necking and/or where the films exhibit essentially no yield point when tested according to ASTM D882-95a. Also preferred are certain flexible films that are hand-tearable. In order to accomplish certain of the above properties, preferably the flexible films are heat-treated.

Typically, flexible films according to the present invention possess more than one of the above-described properties. For example, one particularly preferred flexible film of the present invention comprises a first polymer having a melting temperature of at least about 149° C. (300° F.); and a second polymer having a melting temperature of at least about 149° C. (300° F.), wherein the film exhibits less than about 5% shrinkage when tested according to ASTM D1204 at 149° C. (300° F.), the film exhibits greater than about 40% stress relaxation when tested at 10% elongation, the film exhibits greater than about 55% stress relaxation when tested at 57% elongation, and the film exhibits essentially no yield point when tested according to ASTM D882-95a.

Tapes comprising the flexible films include a backing of the flexible film; and an adhesive coated on at least a portion of one side of the backing for adherence to a substrate. Tapes of the present invention, like flexible films, may optionally be heat-treated. As compared to conventional polyvinyl chloride-containing tapes, tapes of the present invention can be prepared such that they exhibit essentially no ghosting when used, for example, as paint masking tapes on substrates exposed to elevated temperatures.

In one application, an auto paint masking tape comprises a chloride-free backing comprising a blend comprising at least one relatively inflexible polymer and at least one relatively flexible polymer and an adhesive coated on at least a portion of one side of the backing for adherence to an automobile. In another embodiment, an auto paint masking tape comprises a backing comprising a blend comprising at least one relatively inflexible polymer and at least one relatively flexible polymer; and an adhesive coated on at least a portion of one side of the backing for adherence to an automobile, wherein the backing is essentially free of plasticizers.

Auto paint masking tapes of the present invention can be effectively used on automobiles for masking paint thereon. For example, selected portions of an automobile can be protected from paint during painting of the automobile by adhering such an auto paint masking tape to the selected portions of the automobile, painting the automobile, and removing the auto paint masking tape from the selected portions of the automobile.

DETAILED DESCRIPTION OF THE PREFERRED EMBODIMENTS

Tape backing compositions of the present invention comprise a polymer blend that includes at least two polymers. Preferably, at least one of the polymers is relatively flexible and at least one of the polymers is relatively inflexible. It is to be understood, however, that outside of the context of the present invention, all polymers in the blend may be considered flexible.

A polymer's flexibility, as used herein, is measured in relation to the other polymer(s) in the blend. Any suitable method can be utilized for measuring the flexibility of a polymer. For example, the modulus (e.g., Young's modulus) of a polymer has been found to correlate to a polymer's flexibility.

As used herein, "relatively flexible polymers" generally have a relatively low Young's modulus as compared to other polymer(s) in the blend. For example, preferably, the Young's modulus of relatively flexible polymers herein is less than about 207 MPa (30,000 psi), more preferably less than about 103 MPa (15,000 psi), even more preferably less than about 34 MPa (5,000 psi).

As used herein, "relatively inflexible polymers" generally have a relatively high Young's modulus as compared to other polymer(s) in the blend. For example, preferably, the Young's modulus of relatively inflexible polymers herein is greater than about 207 MPa (30,000 psi), more preferably greater than about 345 MPa (50,000 psi), even more preferably greater than about 517 MPa (75,000 psi).

While a wide variety of polymers can be used in the blend, at least one polymer being relatively flexible as compared to the other polymer (preferably such that the Young's moduli of the two polymers differ by at least about 100 MPa, more preferably, at least about 300 MPa, and even more preferably at least about 500 MPa, it is preferred that the blend has a Young's modulus of about 34 MPa (5,000 psi) to about 345 MPa (50,000 psi), more preferably about 69 MPa (10,000 psi) to about 276 MPa (40,000 psi), even more preferably about 103 MPa (15,000 psi) to about 207 MPa (30,000 psi).

One advantage of utilizing blends is greater formulation latitude that they provide. That is, changes in a wide variety of physical properties of films comprising the blends can be effectuated, for example, by varying the ratio of individual polymers in the blends. Furthermore, cost effectiveness is another advantage of utilizing blends. For example, less expensive polymers can be blended with more expensive polymers. In that way, the less expensive polymers can act as an "extender" for the more expensive polymers. Also, using blends can provide advantageous synergistic effects, wherein, for a certain application, the blend can perform substantially better than either polymer by itself for the same application.

Any suitable polymer chemistries can be used in the blends. For example, polyolefin (e.g., polypropylene and polyethylene), polyester (e.g., polyethylene terephthalate), and polyamide (i.e., nylon) polymer chemistries are suitable. It is preferred that the polymers in the blend are compatible (i.e., there is no evidence of gross phase separation of the polymers to an unaided human eye at room temperature). Compatibility is preferably evidenced by the blend exhibiting a single melting temperature and/or each region of discontinuous phase in the blend, or film therefrom (the measurement is substantially the same for both the blend and film), having a diameter of 100 nanometers or less, more preferably about 20 nanometers or less, as measurable using Scanning Electron Microscopy. Accordingly, preferably, each of the polymers in the blends has substantially the same chemistry (i.e., the polymers are derived from the same monomer units) as the other polymer(s) (e.g., all of the polymers in a blend are polypropylene, all of the polymers in a blend are polyester, or all of the polymers in the blend are polyamide).

In one embodiment, the blend comprises at least two polypropylene polymers, preferably consisting essentially only of polypropylene polymers. Accordingly, reference is made to terms that will be used hereinafter, as defined below:

"Polypropylene polymer" refers to a polymer derived from at least about 50 weight % propylene monomers. Preferably, polypropylene polymers of the present invention are derived from at least about 75 weight % propylene monomers, more preferably at least about 95 weight % propylene monomers, most preferably about 100% propylene monomers.

Preferred polypropylene polymers of the present invention have controlled stereoregularity (i.e., such polypropylene polymers have a certain proportion of, for example, isotactic and syndiotactic structures).

"Stereoregular" polymers, as defined by $Hawley's$ $Condensed$ $Chemical$ $Dictionary$ ($12^{th}$ Edition), are those whose molecular structure has a definite spatial arrangement, rather than the random and varying arrangement that characterizes an amorphous polymer. Stereoregular structures include isotactic and syndiotactic structures. In general, polymers can include more than one type of structure throughout its chain length. For example, polymers can include stereoregular, isotactic, and syndiotactic structures, as well as amorphous, atactic structures, or combinations thereof.

"Isotactic" polymers, as defined by $Hawley's$ $Condensed$ $Chemical$ $Dictionary$ ($12^{th}$ Edition), are those whose structure is such that groups of atoms that are not part of the backbone structure are located either all above, or all below, atoms in the backbone chain, when the latter are all in one plane.

"Syndiotactic" polymers, as defined by $Hawley's$ $Condensed$ $Chemical$ $Dictionary$ ($12^{th}$ Edition), are those whose structure is such that groups of atoms that are not part of the backbone structure are located in some symmetrical and recurring fashion above and below the atoms in the backbone chain, when the latter are all in one plane.

"Atactic" polymers, as defined by $Hawley's$ $Condensed$ $Chemical$ $Dictionary$ ($12^{th}$ Edition), are those whose structure is such that groups of atoms are arranged randomly above and below the backbone chain of atoms, when the latter are all in one plane. It is generally understood that substantially atactic polymers are amorphous, amorphous polymers generally lacking a well-defined melting point.

The structure of a polymer can be determined using any suitable method. For example, carbon-13 Nuclear Magnetic Resonance can be used to determine the tacticity of a polymer. To evaluate the polymers using carbon-13 NMR, for example, the test method described in the Test Methods, infra, can be used.

"Relatively flexible" polypropylene polymers are those that are more flexible than the other polymer(s) in the blend. In general, relatively flexible polypropylene polymers will have higher proportions of comonomers (e.g., alpha-olefins, such as 1-octene or 1-hexene) and/or higher proportions of atactic units. Preferably, the flexible polypropylene polymers are at least about 20% atactic, more preferably at least about 25% atactic, even more preferably at least about 30% atactic. It is preferred, however, that the majority of the polymer structure is crystalline. Thus, such polymers are typically less than about 50% atactic. Also, those polypropylenes that are polymerized using a metallocene catalyst system (e.g., those described in PCT Publication No. WO096/26967A) tend to be more flexible than those polymerized using Ziegler Natta catalyst systems (e.g., those described in European. Patent No. 0 475 306).

Examples of such relatively flexible polypropylene polymers include: REXFLEX FPO W101 (commercially available from Huntsman Chemical Corporation; Houston, Tex.), formerly available from Rexene Products; Dallas, Tex.

under the trade designation REXFLEX D100 and those described in copending U.S. patent application Ser. No. 08/956,880 entitled "Elastic Polypropylenes and Catalysts for Their Manufacture."

"Relatively inflexible" polypropylene polymers are those that are less flexible than the other polymer(s) in the blend. Typically, the relatively inflexible polypropylene polymers are mostly isotactic, syndiotactic, or a combination thereof. Preferably, such polymers are isotactic. Preferred relatively inflexible polypropylene polymers are at least about 80% isotactic and/or syndiotactic. More preferably, relatively inflexible polypropylene polymers are at least about 95% isotactic and/or syndiotactic. Most preferably, relatively inflexible polypropylene polymers are essentially isotactic and/or syndiotactic (i.e., at least about 99% isotactic and/or syndiotactic, preferably 100% isotactic and/or syndiotactic).

A wide variety of relatively inflexible polypropylene polymers are readily available, many under the tradenames: FINA (Fina Oil and Chemical Co.; Dallas, Tex.) and ESCORENE (Exxon Polymers; Houston, Tex.). Examples of such inflexible propylene polymers include: FINA 3374 (Fina Oil and Chemical Co.), ESCORENE 1024E3 (Exxon Polymers), ESCORENE 2172E1 (Exxon Polymers), ESCORENE 4792E1 (Exxon Polymers), and ESCORENE 6114E1 (Exxon Polymers).

Each of the relatively flexible and relatively inflexible polypropylene polymers can also be derived from monomers other than propylene. For example, other copolymerizable monomers include α-olefins (e.g., ethylene, 1-hexene, 1-butene, 1-octene, etc.). While these monomers can be included, it is preferred that their amounts be minimized so as not to decrease the overall melting point of the blend. Preferably, such other copolymerizable monomers are present in amounts of about 10 weight % or less, more preferably about 5 weight % or less, and most preferably about 1 weight % or less, based on total monomer weight.

In another embodiment, the blend comprises at least two polyester polymers, preferably consisting essentially only of polyester polymers. For example, polyethylene terephthalate can be utilized as the relatively inflexible polymer and a polyester elastomer can be utilized as the relatively flexible polymer. Examples of such polyester elastomers are HYTREL G3548W and HYTREL G4074, both commercially available from DuPont Polymers; Wilmington, Del.

In another embodiment, the blend comprises at least two polyamide polymers, preferably consisting essentially only of polyamide polymers. One of the polyamide polymers is more flexible than the other polyamide polymer.

In yet another embodiment, the blend comprises at least two polyethylene polymers, preferably consisting essentially only of polyethylene polymers. While the melting temperatures of polyethylenes are typically not as high as those chemistries previously discussed, such blends are suitable for use in environments where the temperature is less than the melting temperature of each individual polymer in the blend. For example, auto aftermarket painting temperatures are typically less than the melting temperatures of polyethylenes. Many other polymer chemistries will be apparent to those of skill in the art and are within the scope of the appended claims.

Each of the relatively flexible and relatively inflexible polymers is preferably present in an amount of about 20 weight % to about 80 weight % based on total weight of the blend. More preferably, each of the relatively flexible and relatively inflexible polymers is present in an amount of at least about 40 weight % based on total weight of the blend.

Advantageously, blends of the present invention can be readily formed into flexible films and exhibit several properties that make them useful in applications, such as in tape backings. Such tape backings can be made into adhesive tapes using any suitable method. These tapes are potentially useful for automobile paint masking, outdoor graphics displays, outdoor lane marking, and industrial applications, especially those where exposure to elevated temperatures is necessary.

The present blends and films therefrom exhibit at least one of the properties described below. Many of these properties are highly desirable for automobile paint masking tapes, for example.

"Environmental Friendliness": Preferred tape backing compositions, films and tapes therefrom essentially do not contain polyvinyl chloride (i.e., they are essentially chloride-free). Most typically, the present blends do not contain any polyvinyl chloride. Thus, when incinerated, such blends do not produce by-products resulting from the presence of polyvinyl chloride, the presence of which results in special handling concerns.

"Minimal or No Ghosting": Ghosting is defined in paint masking applications as occurrences where a tape is applied, sent through a painting process that includes heating, and, upon removal, leaves a residue that is visible to the unaided human eye and the residue is not removable with solvent wipes. Preferably, ghosting of films and tapes comprising the tape backing compositions is minimal. That is, the amount of ghosting is less than that seen with conventional polyvinyl chloride auto paint masking tapes. Most preferably, however, the tapes comprising the present blends exhibit no ghosting.

"Essentially Free of Plasticizers": In order to minimize ghosting, preferred embodiments of the invention do not contain plasticizers. The absence of plasticizers minimizes migration of such plasticizers to adjacent substrates, where they can degrade the substrate. If present, however, it is preferred that the proportion of plasticizers in the total film is about 3 weight % or less.

"Minimal Necking": Preferably, films comprising the tape backing compositions of the present invention exhibit a minimal level of necking. "Necking" refers to a films tendency to yield irrecoverably, inducing strain in the film. Such strain can result in irregular tape lines during application. Preferably, the films exhibit less than about 5% necking when tested according to the "Ultimate Tensile Strength" test, infra. More preferably, however, 0% necking is exhibited. As such, preferably the films do not exhibit a yield point when tested according to ASTM D882-95a, infra.

"Relatively High Stress Relaxation": Preferably, films comprising the tape backing compositions of the present invention exhibit excellent stress relaxation, enabling easy application to irregular surfaces. Once applied, the films readily adhere to (i.e., they do not readily delaminate from) such irregular surfaces. Accordingly, it is preferred that the films exhibit at least about 20%, more preferably 40%, stress relaxation when tested at 10% elongation according to the "Stress Relaxation" test, infra. Similarly, it is preferred that the films exhibit at least about 35%, more preferably 55%, stress relaxation when tested at 57% elongation according to the "Stress Relaxation" test, infra.

"Hand-Tearable": It is also preferred that the present films are readily hand-tearable. While this is a subjective test, the preferred films are at least as easy to tear by hand as conventional polyvinyl chloride films used in auto paint masking applications.

"Heat-Resistant": It is also preferred that the present films are heat-resistant. When used in auto paint masking tapes, for example, the films should be resistant to temperatures of about 149° C. (300° F.), or for the auto aftermarket, about 93° C. (200° F.). Preferably, the films are heat-resistant to temperatures of as high as about 154° C. (310° F.). As evidence of heat resistance, the films preferably exhibit a minimal degree of shrinking when exposed to relatively high temperatures. Thus, they are dimensionally stable at high temperatures, maintaining protection of the surface to which they are adhered.

As such, it is most preferred that the films do not shrink when exposed to temperatures as high as about 93° .C (200° F.), more preferably temperatures as high as 149° C. (300° F.), and most preferably temperatures as high as 154° C. (310° F.). However, shrinkage of as much as 5%, when tested according to ASTM D1204, infra, may be tolerable in some applications. Accordingly, it is preferred that the films do not exhibit more than about 5% shrinkage, more preferably less than about 3% shrinkage, and even more preferably less than about 1% shrinkage.

To obtain heat-resistant films, it is preferred that each polymer in the blend has a melting temperature of at least as great as the temperature at which it is to be used. More preferably, each polymer in the blend has a melting temperature of at least about 10° C. greater than the temperature at which it is to be used.

"Paint-Resistant": Furthermore, it is preferred that the present films are resistant to paint. That is, solvent paints can be applied to one side of the film without bleeding through to the opposite side of the film.

Blending

Blending of the polymers is done by any method that results in a substantially homogenous distribution of the relatively flexible polymer and relatively the inflexible polymer. The polymers can be blended using several methods. In particular, the polymers can be blended by melt blending, solvent blending, or any suitable physical means.

For example, the polymers can be melt blended by a method as described by Guerin et al. in U.S. Pat. No. 4,152,189. That is, all solvent (if used) is removed from each polymer by heating to a temperature of about 150° C. to about 175° C. at a pressure of about 5 Torr to about 10 Torr. Then, the polymers are weighed into a vessel in the desired proportions. The blend is then formed by heating the contents of the vessel to about 175° C., while stirring.

Although melt blending is preferred, the adhesive blends of the present invention can also be processed using solvent blending. In that case, the polymers in the blend should be substantially soluble in the solvents used.

Physical blending devices that provide dispersive mixing, distributive mixing, or a combination of dispersive and distributive mixing are useful in preparing homogenous blends. Both batch and continuous methods of physical blending can be used. Examples of batch methods include BRABENDER (using a BRABENDER PREP CENTER, available from C.W. Brabender Instruments, Inc.; South Hackensack, N.J.) or BANBURY internal mixing and roll milling (using equipment available from FARREL COMPANY; Ansonia, Conn.). Examples of continuous methods include single screw extruding, twin screw extruding, disk extruding, reciprocating single screw extruding, and pin barrel single screw extruding. The continuous methods can include utilizing both distributive elements, such as cavity transfer elements (e.g., CTM, available from RAPRA Technology, Ltd.; Shrewsbury, England) and pin mixing elements, static mixing elements and dispersive elements (e.g., MADDOCK mixing elements or SAXTON mixing elements as described in "Mixing in Single-Screw Extruders," *Mixing in Polymer Processing,* edited by Chris Rauwendaal (Marcel Dekker Inc.: New York (1991), pp. 129, 176–177, and 185–186).

Other Additives

Other additives may also be blended into the tape backing compositions and flexible films and tapes therefrom, depending on the desired application. For example, flame retardants, fillers (e.g., calcium carbonate, silicates, talc, and chalk), dyes, pigments, and nucleating agents can be added as well known to one of ordinary skill in the art.

Application of the Tape Backing Composition

The tape backing composition is readily formed into a flexible film, as described below. The film can be utilized in any suitable application. For example, the film can be used in sheeting products (e.g., decorative, reflective, and graphical), labelstock, and tape backings. Generally such films have a thickness of about 25.4 $\mu$m to about 127 $\mu$m (about 1 mil to about 5 mil).

Tape backing compositions according to the present invention can be utilized to form tape, for example. An adhesive is applied to at least one side of the backing. Preferably the adhesive is able to withstand the same temperatures as the film backing. Any suitable adhesive chemistry can be utilized. For examples, acrylate adhesives, crosslinked rubber-based adhesives, and alpha-olefin adhesives can be used. Such adhesives may be crosslinked to further improve the high temperature performance of the adhesive. Any suitable crosslinking method (e.g., exposure to radiation, such as ultraviolet or electron beam) or crosslinker additive (e.g., phenolic and silane curatives) may be utilized.

When double-sided tapes are formed, an adhesive is coated onto at least a portion of both sides of the backing. Alternatively, a release material (e.g., low adhesion backsize) can be applied to the opposite side of the backing, if desired. Advantageously, the adhesive and/or release material, for example, can be coextruded with the film backing for ease of processing.

Films can be formed using methods well known to one of ordinary skill in the art. For example, the film can be formed using melt extrusion techniques. The tape backing composition can be formed into a film or coating by either continuous or batch processes. An example of a batch process is the placement of a portion of the tape backing composition between a substrate to which the film or coating is to be adhered and a surface capable of releasing the adhesive film or coating to form a composite structure. The composite structure can then be compressed at a sufficient temperature and pressure to form a coating or layer of a desired thickness after cooling. Alternatively, the tape backing composition can be compressed between two release surfaces and cooled.

Continuous forming methods include drawing the tape backing composition out of a heated film die and subsequently contacting the drawn composition to a moving plastic web or other suitable substrate. A related continuous method involves extruding the tape backing composition and a coextruded release material and/or adhesive from a film die and cooling the layered product to form an adhesive tape. Other continuous forming methods involve directly contacting the tape backing composition to a rapidly moving plastic web or other suitable preformed substrate. Using this method, the tape backing composition is applied to the moving preformed web using a die having flexible die lips, such as a conventional film or sheeting die. After forming by any of these continuous methods, the films or layers can be solidified by quenching using both direct methods (e.g., chill rolls or water baths) and indirect methods (e.g., air or gas impingement).

Although coating out of solvent is not preferred, the tape backing compositions can be coated using a solvent-based method. For example, the tape backing composition can be coated by such methods as knife coating, roll coating, gravure coating, rod coating, curtain coating, and air knife coating. The coated solvent-based tape backing composition is then dried to remove the solvent. Preferably, the coated solvent-based tape backing composition is subjected to elevated temperatures, such as those supplied by an oven, to expedite drying.

Films and articles therefrom can, optionally, be heat-treated to further improve dimensional stability of the films and articles. Any suitable heat treatment and method thereof can be used. Preferably, however, the film or article to be treated is unrestrained during the heat treatment. For example, the film or article can be passed over heated rolls. As another example, the film or article can be passed between rolls and heated, such as by a radiant heater.

The tape backing compositions, films, and tapes therefrom are exemplified in the following examples. These examples are merely for illustrative purposes only and are not meant to be limiting on the scope of the appended claims. All parts, percentages, ratios, etc. in the examples and the rest of the specification are by weight unless indicated otherwise.

EXAMPLES

Test Methods
Differential Scanning Calorimetry (DSC)

Modulated DSC was used to measure the melting point of the polymers and blends. Polymer sections, each having a mass of about 5 to 10 milligrams, were cut from pellets of the polymer and crimp-sealed in an aluminum pan. The sealed pan was placed in a Differential Scanning Calorimeter Model TA DSC 2920 with a DATA SYSTEM 2200 (data acquisition and management system), both commercially available from TA Instruments, New Castle, Del. The pan was exposed to a single cycle of temperature from −50° C. to +200° C. at a temperature change of 10° C./minute. Heat capacity of the polymer/blend was plotted versus the melting temperature.

Carbon-13 Nuclear Magnetic Resonance (NMR)

The stereochemistry of the polymer was analyzed using Carbon-13 NMR to determine its tacticity. With mixing at 110° C., approximately 50 milligrams of polymer was dissolved in approximately 1 milliliter of ortho-dichlorobenzene to form a solution. The solution was placed in a UNITY 500 NMR Spectrometer (commercially available from Varian Associates, Palo Alto, Calif.). NMR spectra were obtained at 120° C. using acquisition times between 0.4 and 0.8 seconds, pulse widths between 3.4 and 7.4 microseconds and 200 parts per million (ppm) sweep widths. The region between 18 and 23 ppm was expanded and integrated using the vendor supplied software. Triads and pentads of the spectra were assigned as described in "NMR Spectroscopy and Polymer Microstructure," by A. E. Tonelli (Verlag Carl Hanser (VCH) Publishers, Inc., Munich, 1989, p. 75).

Dynamic Mechanical Analysis (DMA)

Several of the polymers below were tested using DMA to find the shear modulus of the polymers. Also, DMA analysis illustrated whether the materials were generally amorphous (i.e., they did not exhibit a melting temperature) or crystalline.

A RHEOMETRICS RDA II SOLIDS ANALYZER, commercially available from Rheometrics Corporation; Piscataway, N.J., with 25-millimeter-diameter parallel plate geometry, was used for the DMA. The settings on the analyzer were as follows: angular frequency=6.28 radians/second (1 Hertz); heating rate=2° C./minute; strain=1% (except polymer ESCORENE 4792E1 was tested at 0.6% strain); and atmosphere=atmospheric nitrogen. Each polymer to be tested was placed on the parallel plates at room temperature and heated for 10 minutes to 200° C. The parallel plates were then cooled to 22° C. (72° F.). DMA was then conducted on each sample at a heating rate of 2° C./minute. Test conditions and equipment were set according to ASTM D5279-95, entitled "Standard Test Method for Measuring the Dynamic Mechanical Properties of Plastics in Tension." The shear modulus for the polymers tested is indicated in the Glossary of Materials below.

Glossary of Materials

| | |
|---|---|
| AKRON P115 | An aromatic hydrogenated hydrocarbon resin tackifier, obtained from Arakawa Chemical Industries; Moonachie, NJ |
| ELVAX 500W | An ethylene vinyl acetate copolymer prepared from monomers having a weight ratio of 85% ethylene to 15% vinyl acetate (melting point: 91° C., as measured using DSC; shear modulus: not measurable, as measured using DMA), obtained from DuPont Polymers; Wilmington, DE |
| ESCORENE 4792E1 | An ethylene/propylene copolymer prepared from monomers having a weight ratio of 0.6% ethylene to 99.4% propylene (melting point: 161° C., as measured using DSC; shear modulus: 261 kPa, as measured using DMA) stereochemistry: isotactic-90+%); obtained from Exxon Polymers, Houston, TX |
| FINA 3374 | A polypropylene (melting point: 166° C., as measured using DSC, stereochemistry: isotactic-90+%) obtained from Fina Oil and Chemical Co.; Dallas TX |
| HYTREL G3548W | A polybutylene terephthalate/polyether glycol block copolymer (melting point: 156° C., as determined by DuPont, thermoplastic elastomer); obtained from DuPont Polymers; Wilmington, DE |
| HYTREL G4074 | A polybutylene terephthalate/polyether glycol block copolymer (melting point: 170° C., as determined by DuPont, thermoplastic elastomer); obtained from DuPont Polymers; Wilmington, DE |
| IRGANOX 1010 | A hindered phenol antioxidant, obtained from Ciba Specialty Chemicals Corporation; Tarrytown, NJ |
| KRATON G-1726X | A diblock/triblock mixture of styrene/ethylene/butylene terpolymer prepared from monomers having a weight ratio of 70 weight ethylene/butylene and 30 weight percent styrene (melting point: none using DMA; shear modulus: 22.8 kPa, as measured using DMA, diblock content: 70 wt %); obtained from Shell Chemical Company; Houston, TX |
| PET A | Magnetic film grade polyethylene terephthalate made from dimethyl terephthalate and ethylene glycol, commercially available from a wide variety of sources, such as Teijen America, Inc.; New York, NY. |
| PSA1 | A polyolefin pressure-sensitive-adhesive made according to Example 86 of U.S. Pat. No. 5,112,882, except that ARKON P115 was added in the weight ratio of polyoctene to ARKON P115 of 80:20. |
| PSA2 | An acrylate pressure-sensitive adhesive prepared according to Example 1 of U.S. Pat. No. 4,629,663. |
| RENOLIT SK-M SIGNMASK BLUE | A plasticized polyvinyl chloride film, obtained from American Renolit Corporation; Whippany, NJ |
| RENOLIT SK-M SIGNMASK WHITE | A plasticized polyvinyl chloride film, obtained from American Renolit Corporation; Whippany, NJ |
| REXFLEX FPO D100 | A polypropylene (melting point. 158° C., as measured using DSC, stereochemistry: atactic-25%, syndiotactic-31%, isotactic-44%, as measured using NMR); obtained from Rexene Products; Dallas, TX |

| | |
|---|---|
| REXFLEX FPO W101 | A polypropylene (melting point: 158° C., as measured using DSC; shear modulus: 58.0 kPa, as measured using DMA, stereochemistry: atactic-21%, syndiotactic-26%, isotactic-53%, as measured using NMR); obtained from Huntsman Chemical Co.; Houston, TX |

Mechanical Property Tests

Ultimate Tensile Strength

A film sample of the blend, having a width of 25 millimeters (1 inch) and a length of 102 millimeters (4 inches) and a thickness of less than 250 μm, was tested with an INSTRON Tensile Tester (Model 1122), commercially available from Instron Corporation; Canton, Mass. using an initial distance "B" of 51 millimeters (2 inches) between the grips, and a rate of grip separation "A" of 305 millimeters/minute (12 inches/minute) per ASTM D882-95a, entitled "Standard Test Method for Tensile Properties of Thin Plastic Sheeting."

Each film sample was allowed to equilibrate at 23° C. (74° F.) and 50% relative humidity for 40 hours prior to testing. The film sample was placed in the INSTRON Tensile Tester such that it was strained across its thickest dimension (i.e., its width). The initial strain rate "C" was equal to A/B, 6 millimeters/(millimeter·min). The tensile test was conducted at 23° C. (74° F.) and 50% relative humidity. Each sample film was strained until it broke. The applied load vs. elongation was plotted during the test.

"Ultimate Tensile Strength" was calculated from the plot by dividing the applied load at the breaking point by the original cross-sectional area of the film. "Percent Elongation At Break" was calculated by dividing the extended film length at break by the initial gage length of the film and multiplying by 100. "Yield Stress" was calculated by dividing the applied load at the yield point by the original cross-sectional area of the film sample. "Elongation at Yield" was calculated by dividing the extended film length at the yield point by the initial gage length of the film and multiplying by 100. "Elastic Modulus" (also referred to as Young's Modulus) was calculated as the slope of the initial straight-line portion of the stress-strain plot. The "Percent Necking" is defined as the yield point minus the adjacent minimum stress, divided by the yield stress times 100. Upon testing, where there was no defined yield point, no necking occurred.

Stress Relaxation

In order to determine the tendency of a film to relax or lose stress with time, a stress relaxation test was performed. The test was conducted on an INSTRON Tensile tester Tester (Model 1122), commercially available from Instron Corporation; Canton, Mass. using an initial distance of 51 millimeters (2 inches) between the grips, and a rate of grip separation of 1.27 meters/minute (50 inches/minute). The rate of grip separation remained constant until a predetermined elongation (as described below) was obtained. After the predetermined elongation was reached, the grips stopped, giving a strain rate of zero.

Predetermined elongation points were 10% (corresponding to a point where necking usually occurs if the film is prone to necking) and 57% (corresponding to the calculated elongation needed for a flat polymer film to conform to a surface having 4 elongated, rounded protrusions at spacings of 5.1 centimeters (2 inches) and having progressively increasing depths of 1.52 millimeters (0.06 inches), 3.04 millimeters (0.12 inches), 5.08 millimeters (0.20 inches), and 7.36 millimeters (0.29 inches). The respective width of each protrusion also progressively increased from 15.24 millimeters (0.60 inches), 19.05 millimeters (0.75 inches), 21.60 millimeters (0.85 inches), and 23.62 millimeters (0.93 inches).

Stress was monitored for three minutes. The percent loss in stress for a predetermined elongation was defined as 100 times (the maximum stress in the range up to and including the predetermined elongation minus the minimum stress after 3 minutes) divided by the maximum stress in the range up to and including the predetermined elongation. For a film to be dimensionally stable and conformable, it preferably has at least 20% stress relaxation after 10% elongation without an appreciable amount of necking. More preferably, the film has at least 45% stress relaxation after 57% elongation without having an appreciable amount of necking.

Shrinkage

"Unrestrained Linear Thermal Shrinkage of Plastic Film" was measured according to ASTM D1204. A film sample having dimensions of 2.54 centimeters ×10.16 centimeters was cut with a die. Notches, for reference points, were made 75 millimeters (three inches) apart in the machine direction (MD). Each film sample was placed unrestrained in an oven for 10 minutes at 149° C. (300° F.). Upon removal, film shrinkage was measured for both the MD direction and cross web (or transverse) direction (CD) direction. MD Shrinkage was set equal to the change in distance between notches divided by the initial distance between notches of 75 millimeters (three inches) apart in the machine direction. CD shrinkage was measured as the change in width divided by the initial width (cross web direction). The larger value was reported and was the MD shrinkage, unless otherwise noted.

Ghosting

A 2.54-centimeter-diameter circle was cut out of the film to be tested. The circle was then placed on a pre-painted, dried panel. A 25-gram weight was placed over the film. The structure was placed in an oven and heated to 149° C. (300° F.) for 30 minutes. Then, the structure was removed and allowed to cool. Upon cooling, the film was removed from the panel and the amount of ghosting was measured.

The ghosting measurement for the films was qualitative, with a measure of "none" indicating that one could not tell where the film had been. A measure of "heavy" indicated that the ghosting was comparable to that experienced with conventional PVC films, as noted in Table IV (Comparative Examples C2-C3).

Tapes were also tested for ghosting. The ghosting measurement for the tapes was also qualitative, with a measure of "none" indicating that one could not tell where the tape had been. A measure of "heavy" indicated that ghosting was comparable to that experienced with conventional PVC films, as noted in Table IV (Comparative Examples C2-C3).

Hand Tearability

Hand tearability testing involved attempting to tear the film/tape in the cross web direction using an uninitiated tear test (i.e., a notch or initiation point was not put on the film). The ability to tear the tape was referenced to a control. Ease of hand tearability was noted, with the control exhibiting average ease of hand tearability (Comparative Example C2).

Peel Adhesion

Each tape samples was tested for peel adhesion according to Test Method A of ASTM D3330, entitled "Standard Test Methods for Peel Adhesion of Pressure-Sensitive Tape at 180° Angle."

Examples 1–7

Comparative Examples C1–C3

In Example 1, REXFLEX W101, ESCORENE 4792E1, and IRGANOX 1010 were preblended in a weight ratio of 30:70:0.1. The blend was fed into the feed throat of a 30 millimeter diameter, fully intermeshing co-rotating twin-screw extruder Model ZSK (commercially available from W & P Corporation; Ramsey, N.J.) with an inside diameter of 30 millimeters, a length to diameter (L/D) ratio of 27:1, and a screw speed of 350 revolutions per minute to form a melt blend. Within the extruder from zone 1 to zone 3, the temperature was progressively increased from 138° C. to 204° C. (280° F. to 400° F.). In zones 4–8, the temperature was maintained at 204° C.

The melt blend was continuously discharged at a pressure of at least about 0.69 MPa (100 psi) into a ZENITH PEP II, 10 cubic centimeters per revolution melt pump (commercially available from Parker Hannifin Corporation; Sanford, N.C.) and passed to a single layer 25.4 cm (10 inch) wide film die (commercially available under the trade designation, ULTRAFLEX 40, from Extrusion Dies, Inc.; Chippewa Falls, Wis.) to form a film. The film die was maintained at 204° C. (400° F.), with a die gap of approximately 0.5 millimeters (20 mils).

The melt blend was cast onto a chill roll maintained at 24° C. (75° F.). Then, the melt blend was laminated to a 25 μm (1 mil)-thick, biaxially oriented polyethylene terephthalate (PET) liner moving at a line speed of 6.4 meters/minute (21 feet/minute) to produce a film with a thickness of 77 μm (3 mil). The polypropylene film was collected, the PET liner was removed, the films were laminated to TEFLON sheets, and the films were placed in an oven at 149° C. (300° F.) for 10 minutes to anneal residual stresses and optimize the crystallinity of the film.

Films of Examples 2–7 were made in substantially the same manner as Example 1, except the weight ratios of REXFLEX W101 and ESCORENE 4792E1 were 40:60, 50:50, 60:40, 70:30, 80:20, and 90:10, respectively. Comparative Example C1 was made as Example 1, except REXFLEX W101 was not used. Comparative Examples C2 and C3 were RENOLIT SK-M SIGNMASK BLUE and RENOLIT SK-M SIGNMASK WHITE, respectively, each having a thickness of 79 μm (3.1 mil).

TABLE II

| Ex. | Weight % REXFLEX W101 | Weight % ESCORENE 4792E1 | Ultimate Tensile Strength, Mpa (psi) | Elastic Modulus, MPa (psi) | Necking (%) |
|---|---|---|---|---|---|
| C1 | 0 | 100 | 66 (9,540) | 711 (103,100) | 23.0 |
| 1 | 30 | 70 | 31 (4,429) | 262 (37,860) | 5.0 |
| 2 | 40 | 60 | 25 (3,679) | 206 (29,890) | 3.0 |
| 3 | 50 | 50 | 22 (3,157) | 169 (24,530) | 0 |
| 4 | 60 | 40 | 21 (3,078) | 120 (17,430) | 0 |
| 5 | 70 | 30 | 16 (2,390) | 85 (12,300) | 0 |
| 6 | 80 | 20 | 19 (2,804) | 39 (5,590) | 0 |
| 7 | 90 | 10 | 15 (2,222) | 39 (5,630) | 0 |
| C2 | N/A | N/A | 25 (3,563) | 218 (14,810) | 0 |
| C3 | N/A | N/A | 27 (3,976) | 305 (44,160) | 0 |

TABLE III

| Ex. | Weight % REXFLEX W101 | Weight % ESCORENE 4792E1 | Shrinkage (%) | 10% Stress Relaxation (%) | 57% Stress Relaxation (%) |
|---|---|---|---|---|---|
| C1 | 0 | 100 | 2.0 | 36.4 | 52.7 |
| 1 | 30 | 70 | 2.0 | 36.3 | 57.6 |
| 2 | 40 | 60 | 0.6 | 32.3 | 56.2 |
| 3 | 50 | 50 | 1.0 | 38.5 | 57.3 |
| 4 | 60 | 40 | 1.0 | 38.4 | 58.1 |
| 5 | 70 | 30 | 2.0 | 41.8 | 60.7 |
| 6 | 80 | 20 | 1.0 | 52.0 | 60.3 |
| 7 | 90 | 10 | 18 | 39.3 | 66.5 |
| C2 | N/A | N/A | 12 | 63.7 | 72.7 |
| C3 | N/A | N/A | 7.4 | 50.8 | 63.9 |

TABLE IV

| Ex. | Weight % REXFLEX W101 | Weight % ESCORENE 4792E1 | Hand Tearability | Ghosting |
|---|---|---|---|---|
| C1 | 0 | 100 | easy | None |
| 1 | 30 | 70 | Average | Moderate |
| 2 | 40 | 60 | Average | Moderate |
| 3 | 50 | 50 | Average | Moderate |
| 4 | 60 | 40 | easy | Moderate |
| 5 | 70 | 30 | easy | Moderate |
| 6 | 80 | 20 | easy | Moderate |
| 7 | 90 | 10 | easy | Moderate |
| C2 | N/A | N/A | Average | Heavy |
| C3 | N/A | N/A | Difficult | Heavy |

Example 8

Example 8 was prepared as Example 1, except FINA 3374 was substituted for ESCORENE 4792E1. The two polymers were blended in a weight ratio of 50:50. The results are reported below together with those of Example 3 (polymers blended in a weight ratio of 50:50) for comparative purposes.

TABLE V

| Ex. | Ultimate Tensile Strength, MPa (psi) | Elastic Modulus, MPa (psi) | Necking (%) | Shrinkage (%) | 10% Stress Relaxation (%) | 57% Stress Relaxation (%) |
|---|---|---|---|---|---|---|
| 8 | 26 (3,828) | 192 (27,770) | 0 | 1.0 | 37.0 | 57.1 |
| 3 | 22 (3,157) | 169 (24,530) | 0 | 1.0 | 38.5 | 57.3 |

Examples 9–13

Example 9–13 were prepared by preblending REXFLEX W101, ESCORENE 4792E1 and IRGANOX 1010 in a weight ratio of 50:50:0.1. The blend was fed into the feed throat of a 30 millimeter diameter, fully intermeshing co-rotating twin-screw extruder Model ZSK (commercially available from W & P Corporation; Ramsey, N.J.) with an inside diameter of 30 millimeters, a length to diameter (L/D) ratio of 27:1, and a screw speed of 350 revolutions per minute to form a melt blend. Within the extruder from zone 1 to zone 3, the temperature was progressively increased from 138° C. to 204° C. (280° F. to 400° F.). In zones 4–8, the temperature was maintained at 204° C.

The melt blend was continuously discharged at a pressure of at least about 0.69 MPa (100 psi) into a ZENITH PEP II, 10 cubic centimeters per revolution melt pump (commercially available from Parker Hannifin Corporation; Sanford, N.C.) and passed to a single layer 25.4 cm (10 inch) wide film die (commercially available under the trade designation, ULTRAFLEX 40, from Extrusion Dies, Inc.; Chippewa Falls, Wis.) to form a film. The film die was maintained at 204° C. (400° F.), with a die gap of approximately 0.5 millimeters (20 mils).

The melt blend was cast onto a chill roll maintained at 24° C. (75° F.). Then, the melt blend was laminated to a 25 μm (1 mil)-thick, biaxially oriented polyethylene terephthalate (PET) liner moving at a line speed of 6.4 meters/minute (21 feet/minute) to produce a film with a thickness of 77 μm (3 mil). The polypropylene film was collected, the PET liner was removed, the films were laminated to TEFLON sheets, and the films were placed in an oven at 149° C. (300° F.) for 10 minutes to anneal residual stresses and optimize the crystallinity of the film.

Example 10–13 were placed in an INSTRON Tensile Tester (Model No. 1122), commercially available from Instron Corporation; Canton, Mass. with a 102 millimeter (4.00 inches) initial jaw separation and stretched at a rate of 50 millimeters/minute (2.0 inches/minute) until final lengths of about 112 millimeters (4.4 inches), 117 millimeters (4.6 inches), 122 millimeters (4.8 inches) and 127 millimeters (5.0 inches), respectively, were obtained. These final lengths corresponded to respective strains of 10%, 15%, 20% and 25%. The process of oven heat treating and controlled stretching was then repeated on these four films.

The films were tested after each oven heat treatment and stretch cycle according to the test methods described above. The results are reported below as the average of the two cycles.

TABLE VI

| Ex. | Strain % | Ultimate Tensile Strength, MPa (psi) | Elastic Modulus, MPa (psi) | Necking (%) | Shrinkage (%) | 10% Stress Relaxation (%) | 57% Stress Relaxation (%) |
|---|---|---|---|---|---|---|---|
| 9 | 0 | 34 (4,969) | 104 (15,115) | 0 | 0.8 | 42.1 | 55.6 |
| 10 | 10 | 31 (4,503) | 93 (13,520) | 0 | 1.4 | 41.1 | 55.5 |
| 11 | 15 | 32 (4,575) | 96 (13,900) | 0 | 4.5 | 35.6 | 43.6 |
| 12 | 20 | 21 (3,075) | 91 (13,205) | 0 | 3.5 | 40.0 | 44.3 |
| 13 | 25 | 21 (3,000) | 90 (13,080) | 0 | 2.5 | 36.6 | 43.7 |

Examples 14–15

Examples 14 and 15 were made in substantially the same manner as Example 3, except that stress relaxation condition was varied. Example 14 was annealed at 135° C. (275° F.). Example 15 was not annealed. The results are compared to Example 3.

TABLE VII

| Ex. | Ultimate Tensile Strength, MPa (psi) | Elastic Modulus, MPa (psi) | Necking (%) | Shrinkage (%) | 10% Stress Relaxation (%) | 57% Stress Relaxation (%) |
|---|---|---|---|---|---|---|
| 14 | 24 (3,418) | 164 (23,740) | 4 | 1.0 | 37.6 | 59.7 |
| 15 | 24 (3,471) | 192 (27,850) | 21 | 3.0 | 43.1 | 57.3 |
| 3 | 22 (3,157) | 169 (24,530) | 0 | 1.0 | 38.5 | 57.3 |

Example 16 and Comparative Examples C4–C6

Example 16 and Comparative Examples C4–C6 were prepared as in Example 1, except a single screw extruder was used and the ratio of components was varied. The extruder was a 32 millimeter(1.25 inch)-diameter single screw extruder (commercially available from Killion Extruders; Cedar Grove, N.J., as Model No. KTS-125) having a length to diameter (L/D) ratio of 24:1. The extruder also contained a dispersive mixing section. In Example 16, the weight ratio of REXFLEX W101 to ESCORENE 4792E1 was 50:50. In Comparative Examples C4 and C5, KRATON G-1726X and FINA 3374 were substituted for the REXFLEX W101 and ESCORENE 4792E1 at weight ratios of 20:80 and 35:65, respectively. In Comparative Example C6, ELVAX 5000W and FINA 3374 were substituted for the REXFLEX W101 and ESCORENE 4792E1 at a weight ratio of 20:80.

The film samples were tested according to the methods described above. The results are reported below together with those of Example 3.

TABLE VIII

| Ex. | Ultimate Tensile Strength, MPa (psi) | Elastic Modulus, MPa (psi) | Necking (%) | Shrinkage (%) | 10% Stress Relaxation (%) | 57% Stress Relaxation (%) |
|---|---|---|---|---|---|---|
| 16 | 17 (2,467) | 119 (17,300) | 4.0 | 4.0 | 47 | 71 |
| C4 | 35 (5,103) | 268 (38,850) | 27 | 3.0 | 42 | 64 |
| C5 | 19 (2,832) | 98 (14,170) | 11 | 25 | 39 | 62 |
| C6 | 19 (2,785) | 182 (26,350) | 11 | 12 | 42 | 58 |
| 3 | 22 (3,157) | 169 (24,530) | 0 | 1.0 | 38.5 | 57.3 |

Examples 17–18

The film of Example 17 was made in a manner similar to Example 1, except the weight ratio of REXFLEX W101 and ESCORENE 4792E1 was 50:50 and after the cast film was laminated to a PET liner, the film side of the laminate was passed against a series of 8 heated metal rolls instead of being placed in an oven after collection. Each roll had a diameter of 12.7 centimeters (5 inches) and a surface contact with the film of 180°. The rolls were preheated to and maintained at the following temperatures: rolls 1 & 2—about 49° C. (120° F.), rolls 3 & 4—about 71° C. (150° F.), rolls 5 & 6—about 93° C. (200° F.) and rolls about 149° C. (300° F.). The film was exposed to the set of rolls for a total of about 5 seconds. Example 18 was made as in Example 17, except the film did not contact the heated metal rolls.

TABLE IX

| Ex. | Ultimate Tensile Strength, MPa (psi) | Elastic Modulus, MPa (psi) | Necking (%) | Shrinkage (%) | 10% Stress Relaxation (%) | 57% Stress Relaxation (%) |
|---|---|---|---|---|---|---|
| 17 | 37 (5,410) | 92 (13,290) | 0 | 2 | 41.0 | 67.8 |
| 18 | 39 (5,620) | 170 (24,580) | 19 | 5 | 42.9 | 68.5 |

Examples 19–20 and

Comparative Examples C7–C8

Tapes were prepared with two different pressure-sensitive adhesives. Example 19 was made by hot-melt coating PSA 1 onto the film of Example 18 with a Haake single screw extruder (a Haake RHEOCORD with a Haake RHEOMDX extruder, commercially available from Haake; Paramus, N.J.), with an inside diameter of 19 millimeters (0.75 inches), a L/D ratio of 24:1, a compression ratio of 3:1, and a screw speed of 110 revolutions per minute, such that the thickness of the layer of PSA1 was 36 μm (1.4 mil). The coated film was irradiated under a nitrogen atmosphere with 300 milliJoules/cm$^2$ of ultraviolet energy as measured by a UVIMAP 365 sensing device (commercially available from Electronic Instrumentation and Technology, Inc., Sterling, Va.) from medium pressure mercury lamps, obtained from Aetek; Plainfield, Ill. The calibration standard used for measuring the amount of ultraviolet energy was MIL-STD-45662A.

Example 20 was made by solution coating PSA2 with a notched bar onto a corona-treated film of Example 18. To corona treat the film, a sinusoidal alternating current having a voltage of about 10–20 kiloVolts and a frequency of about 10–40 kiloHertz was generated between two electrodes. The film was passed between the electrodes.

The pressure-sensitive adhesive layer was dried at 93° C. (200° F.) for 5 minutes to form an adhesive layer having a thickness of 25.5 μm (1 mil). Comparative Examples C7 and C8 were made the same way as those in Examples 19 and 20, except the films were the same as used in Comparative Example C2 and Comparative Example C3, respectively.

TABLE X

| Ex. | Peel Adhesion N/dm (oz/in) | Ultimate Tensile Strength, MPa (psi) | Elastic Modulus, MPa (psi) | Necking (%) | Shrinkage (%) |
|---|---|---|---|---|---|
| 19 | 79 (72) | 36 (5,200) | 171 (24,750) | 3 | 3 |
| 20 | 26 (24) | 35 (5,100) | 170 (24,600) | 2 | 3 |
| C7 | 77 (70) | 28 (4,050) | 159 (23,000) | 0 | 15 |
| C8 | 22 (20) | 29 (4,260) | 162 (23,500) | 0 | 15 |

TABLE XI

| Ex. | 10% Stress Relaxation (%) | 57% Stress Relaxation (%) | Ghosting | Hand Tearability |
|---|---|---|---|---|
| 19 | 44.6 | 64.0 | None | easy |
| 20 | 45.0 | 64.5 | very slight | easy |
| C7 | 58.0 | 65.0 | Moderate | average |
| C8 | 58.1 | 65.5 | Heavy | average |

Examples 21–24

Films were prepared as in Example 1, except the materials were placed in an oven set at 110° C. (230° F.) for 4 hours to remove excess water before they were melt blended and extruded and the polymers used and their proportions were different. Example 21 used a ratio of 50:50 of polymers PET A and HYTREL G3548W. Example 22 used a ratio of 40:60 of polymers PET A and HYTREL G4074, respectively. Example 23 used a ratio of 40:60 of polymers PET A and HYTREL 63548W, respectively. Example 24 used a ratio of 60:40 of polymers PET A and HYTREL G3548W, respectively. The polymers were thoroughly pre-dried. The PET A polymers were placed in an oven set at 110° C. (230° F.) for 4 hours to remove excess water before they were melt-blended and extruded.

The blends were fed into the feed throat of a 30-millimeter-diameter, fully intermeshing co-rotating twin-screw extruder Model ZSK (commercially available from W & P Corporation; Ramsey, N.J.) with an inside diameter of 30 millimeters, a length to diameter (L/D) ratio of 27:1, and a screw speed of 350 revolutions per minute to form a melt blend. Within the extruder from zone 1 to zone 3, the temperature was progressively increased from 93° C. to 288° C. (200° F. to 550° F.). In zones 4–8, the temperature was maintained at 288° C.

The melt blends were continuously discharged at a pressure of at least about 0.69 MPa (100 psi) into a ZENITH PEP II, 10 cubic centimeters per revolution melt pump (commercially available from Parker Hannifin Corporation; Sanford, N.C.) and passed to a single layer 25.4 cm (10 inch) wide film die (commercially available under the trade designation, ULTRAFLEX 40, from Extrusion Dies, Inc.; Chippewa Falls, Wis.) to form a film. The film die was maintained at 288° C. (550° F.), with a die gap of approximately 0.5 millimeters (20 mils).

The melt blends were cast onto a chill roll maintained at 24° C. (75° F.). Then, the melt blends were laminated to a 25 μm (1 mil)-thick, biaxially oriented polyethylene terephthalate (PET) liner moving at a line speed of 6.4 meters/minute (21 feet/minute) to produce a film with a thickness of 77 μm (3 mil). The film was collected, the liner was removed, the films were laminated to TEFLON sheets, and the films were placed in an oven at 149° C. (300° F.) for 10 minutes to anneal residual stresses and optimize the crystallinity of the film.

TABLE XII

| Ex. | PET A | * | Ultimate Tensile Strength, MPa (psi) | Elastic Modulus, MPa (psi) | Necking (%) | Shrinkage (%) | 10% Stress Relaxation (%) | 57% Stress Relaxation (%) |
|---|---|---|---|---|---|---|---|---|
| 21 | 50 | 50 | 13 (1,890) | 230 (33,380) | 0 | 3** | 24 | 45 |
| 22 | 40 | 60 | 5 (746) | 115 (16,650) | 0 | 0.7 | 28 | 48 |
| 23 | 40 | 60 | 4 (528) | 29 (4,212) | 0 | 4** | 23 | *** |
| 24 | 60 | 40 | 42 (6,136) | 612 (88,830) | 21 | 3** | 14 | 35 |

*Polymer HYTREL G4074 for Example 21 and polymer HYTREL G3548W for Examples 22–24
**CD Shrinkage
***The sample broke Various modifications and alterations of this invention will become apparent to those skilled in the art without departing from the scope and spirit of the invention. It should be understood that this invention is not limited to the illustrative embodiments set forth herein.

What is claimed is:

1. A flexible film, comprising a blend of:
   a first relatively flexible polypropylene polymer comprising at least 95% by weight propylene monomer and having a melting temperature of at least about 149° C. (300° F.) and a Young's modulus of less than 207 MPa; and
   a second relatively in flexible polypropylene polymer comprising at least 95% by weight propylene monomer and having a melting temperature of at least about 149° C. (300° F. ) and a Young's modulus of greater than 207 MPa.

2. The flexible film of claim 1, wherein the first relatively flexible polypropylene polymer is at least about 20% atactic and the second relatively inflexible polypropylene polymer is at least about 80% syndiotactic and/or isotactic.

3. The flexible film of claim 2, wherein the first relatively inflexible polypropylene polymer is about 25% atactic to about 50% atactic.

4. The flexible film of claim 1, wherein the blend exhibits a single melting temperature.

5. The flexible film of claim 1, wherein each polymer in the blend has a melting temperature of at least about 154° C. (310° F.).

6. The flexible film of claim 1, wherein the each of the first relatively flexible and second relatively inflexible polymers comprises at least about 20 weight % of the blend.

7. The flexible film of claim 1, wherein the each of the first relatively flexible and second relatively inflexible polymers comprises at least about 40 weight % of the blend.

8. The flexible film of claim 1, wherein the film exhibits less than about 5% shrinkage when tested according to ASTM D1204 at 149° C. (300° F.).

9. The flexible film of claim 1, wherein the film exhibits less than about 2% shrinkage when tested according to ASTM D1204 at 93° C. (200° F.).

10. The flexible film of claim 1, wherein the film exhibits less than about 2% shrinkage when tested according to ASTM D1204 at 149° C. (300° F.).

11. The flexible film of claim 1, wherein the film exhibits greater than about 20% stress relaxation when tested at 10% elongation.

12. The flexible film of claim 1, wherein the film exhibits greater than about 40% stress relaxation when tested at 57% elongation.

13. The flexible film of claim 1, wherein the film exhibits less than about 5% necking.

14. The flexible film of claim 1, wherein the film exhibits essentially no yield point when tested according to ASTM D882-95a.

15. The flexible film of claim 1, wherein the first polymer has an elastic modulus of about 103 MPa or less and the second polymer has an elastic modulus of about 207 MPa or more.

16. The flexible film of claim 1, wherein the film is heat-treated.

17. A hand-tearable flexible film comprising a blend of:
   a first relatively flexible polypropylene polymer comprising at least 95% by weight propylene monomer and having a melting temperature of at least about 149° C. (300° F.) and a Young's modulus of less than 207 MPa; and
   a second relatively inflexible polypropylene polymer comprising at least 95% by weight propylene monomer and having a melting temperature of at least about 149° C. (300° F.) and a Young's modulus of greater than 207 MPa.

18. A flexible film, comprising:
   a first relatively flexible polypropylene polymer comprising at least 95% by weight propylene monomer and having a melting temperature of at least about 149° C. (300° F.) and a Young's modulus of less than 207 MPa; and a second relatively inflexible polypropylene polymer comprising at least 95% by weight propylene monomer and having a melting temperature of at least about 149° C. (300° F.) and a Young's modulus of greater than 207 MPa.

wherein the film exhibits less than about 5% shrinkage when tested according to ASTM D 1204 at 149° C. (300° F.), the film exhibits greater than about 40% stress relaxation when tested at 10% elongation, the film exhibits greater than about 55% stress relaxation when tested at 57% elongation, and the film exhibits essentially no yield point when tested according to ASTM D882-95a.

19. A tape comprising:

a backing comprising a blend of:
- a first relatively flexible polypropylene polymer comprising at least 95% by weight propylene monomer and having a melting temperature of at least about 149° C. (300° F.) and a Young's modulus of less than 207 MPa; and
- a second relatively inflexible polypropylene polymer comprising at least 95% by weight propylene monomer and having a melting temperature of at least about 149° C. (300° F.) and a Young's modulus of greater than 207 MPa; and
- an adhesive coated on at least a portion of one side of the backing for adherence to a substrate.

20. The tape of claim 19, wherein the tape exhibits essentially no ghosting.

21. The tape of claim 19, wherein the tape is heat-treated.

22. An automobile comprising the tape of claim 19.

23. An auto paint masking tape, comprising:

a chloride-free backing comprising a blend comprising a first relatively flexible polypropylene polymer comprising at least 95% by weight propylene monomer and having a melting temperature of at least about 149° C. (300° F.) and a Young's modulus of less than 207 MPa; and a second relatively inflexible polypropylene polymer comprising at least 95% by weight propylene monomer and having a melting temperature of at least about 149° C. (300° F.) and a Young's modulus of greater than 207 MPa; and an adhesive coated on at least a portion of one side of the backing for adherence to an automobile.

24. An automobile, comprising the auto paint masking tape of claim 23.

25. An automobile, comprising the auto paint masking tape of claim 21.

26. An auto paint masking tape, comprising:

a backing comprising a blend comprising a first relatively flexible polypropylene polymer comprising at least 95% by weight propylene monomer and having a melting temperature of at least about 149° C. (300° F.) and a Young's modulus of less than 207 MPa; and a second relatively inflexible polypropylene polymer comprising at least 95% by weight propylene monomer and having a melting temperature of at least about 149° C. (300° F.) and a Young's modulus of greater than 207 MPa; and an adhesive coated on at least a portion of one side of the backing for adherence to an automobile, wherein the backing is essentially free of plasticizers.

* * * * *

UNITED STATES PATENT AND TRADEMARK OFFICE
CERTIFICATE OF CORRECTION

PATENT NO.    : 6,436,531 B1
DATED         : August 20, 2002
INVENTOR(S)   : Kollaja, Richard A.

It is certified that error appears in the above-identified patent and that said Letters Patent is hereby corrected as shown below:

Column 11,
Line 51, delete "tester" following "Tensile"

Column 12,
Line 59, "samples" should read -- sample --

Column 17,
Line 57, "RHEOMDX" should read -- RHEOMIX --

Column 19,
Line 61, "inflexible" should read -- flexible --

Signed and Sealed this

Twenty-second Day of July, 2003

JAMES E. ROGAN
*Director of the United States Patent and Trademark Office*